Patented Dec. 8, 1953

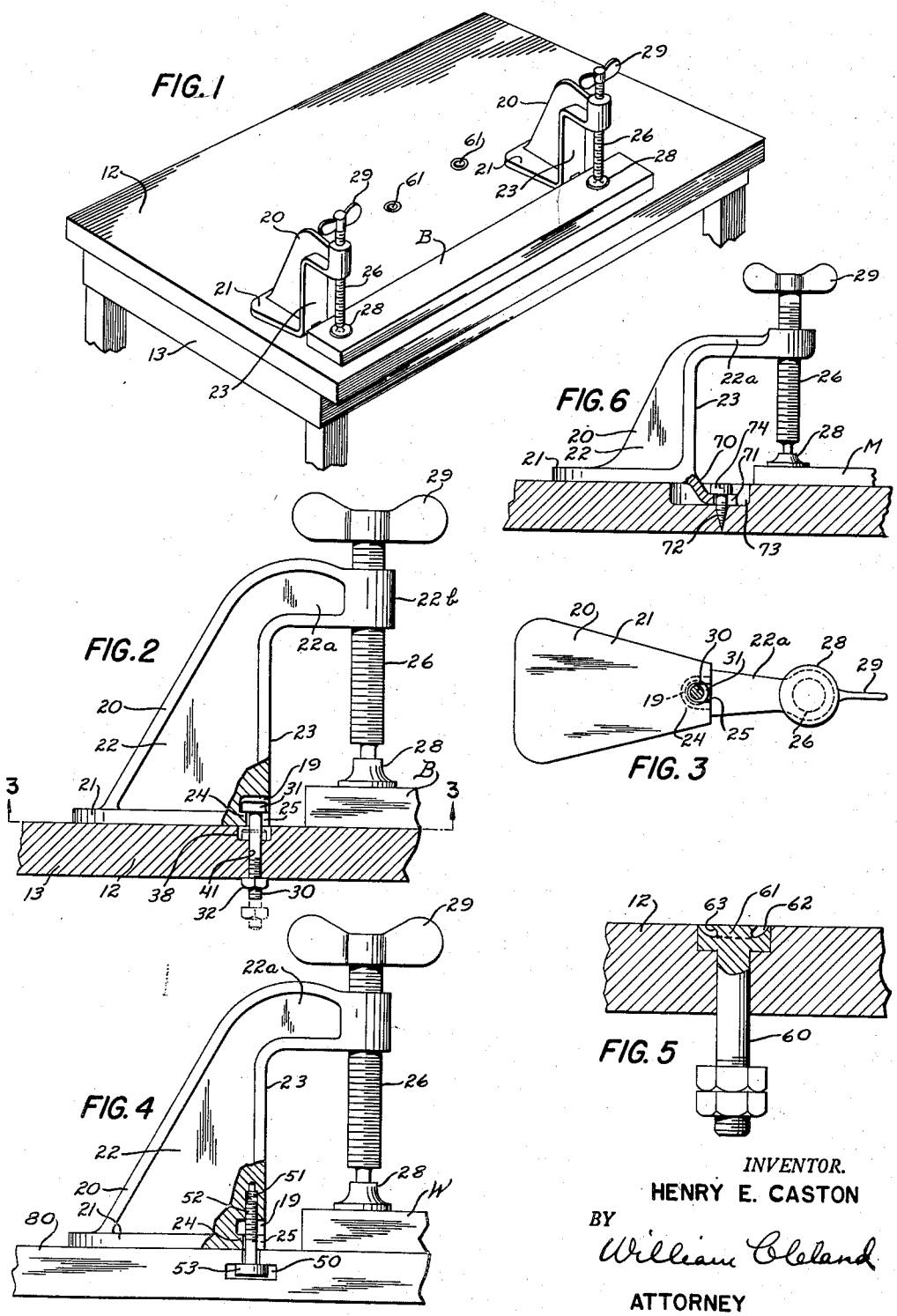

2,661,783

UNITED STATES PATENT OFFICE 2,661,783

QUICKLY ATTACHABLE OR REMOVABLE SURFACE CLAMP

Henry E. Caston, Akron, Ohio

Application December 22, 1949, Serial No. 134,393

3 Claims. (Cl. 144—290)

This invention relates to surface clamps, and in particular relates to a surface clamp for use on benches or other flat working surfaces.

One object of the present invention is to provide a clamp which may be quickly attached in fixed positions for use on a work bench top, for example, without necessarily requiring tools of any kind.

Other objects of the invention will be manifest from the following brief description and the accompanying drawings.

Of the drawings:

Figure 1 is a top perspective view showing two clamping devices embodying the features of the invention in position for use on a bench top.

Figure 2 is a side elevation, partly broken away and in section, of one of the clamping devices shown in Figure 1.

Figure 3 is a bottom plan view of the clamp, taken substantially on the line 3—3 in Figure 2.

Figure 4 is a view similar to Figure 2, but showing a modified form of the clamp.

Figure 5 is an enlarged fragmentary view of a modified form of attaching bolt for use with the clamp as shown in Figure 2.

Figure 6 is an elevation of a modified form of the invention.

Referring to Figure 1 of the drawings, there is illustrated a pair of clamping devices 20, 20, embodying the features of the invention, the same being shown releasably attached to the top surface 12 of a work bench 13 and clamping a board B thereon.

As best shown in Figures 2 and 3, each clamping device may include a clamping bracket 20 provided with a relatively broad, flat-bottomed supporting base 21 for an upright 22, from the upper end of which extends an integral horizontal extension 22a adapted to overhang the working surface unobstructedly with respect to any other part of the bracket. A threaded aperture 22b is provided in the member 22a for vertical reception of a pressure-applying screw shaft 26, the same extending axially to the plane of the base 21 and being provided on the lower end thereof with a clamping foot 28 which is swivelly connected to the lower end of the screw shaft 26 for flat engagement with the work B. With the bracket 20 anchored to the working surface, by anchor means 30, to be described later, the screw shaft is adapted to be turned to apply clamping pressure to the work, turning of the screw shaft being facilitated by provision of a thumb nut 29 fixed on the upper end thereof.

For anchoring the bracket 20 to the table top a recess or cavity 19 is provided in the inner face 23 of the bracket 20 at a point spaced slightly above the bottom of the base, said recess 19 defining, in the same general plane as the base, a horizontal web portion 24 having an inwardly opening slot 25 adapted to receive an anchor bolt 30 which is vertically shiftably mounted through an aperture 41 through the table top, with the head 31 of the bolt received in the recess 19. The bolt 30 has one or more nuts 32 threaded on the lower end thereof, for adjustably limiting upward shifting of the bolt when the head of the bolt is in a predeterminately spaced position above the top of the working surface, this space being just sufficient to permit free but tight reception of said web portion between the head 31 and the table top. For providing an unobstructed working surface on the table when the bolt is disengaged from the clamp to permit removal thereof from the table, the bolt-receiving aperture 41 in the table top is counterbored as at 38 to receive the head 31 of the bolt when the same is in downwardly retracted position, as shown in chain-dotted lines in Figure 2.

In use or operation of the improved clamping device 20, as for releasably attaching an article of work, such as a block of wood B to the top of the work bench, the bolt 30 is manually lifted out of the aperture 41 above the table top, as limited by engagement of the stop nut with the underside of said table top, to position the head of the bolt to permit free but tight reception of said web portion between the head of said bolt and the top of the table. While the bolt is retained in this position, the clamp bracket is manipulated to engage the head of the bolt within the recess 19 in the bracket and also to receive the shank of the bolt within the slot 25 of the web portion 24.

With the clamping bracket 20 thus firmly but releasably attached to the table top, the block B may be positioned under the clamping foot 28 of the pressure-applying screw shaft 26. Through the thumb nut 29 the screw shaft 26 may be used to apply clamping action to the block to firmly hold the same on the table while it is otherwise being worked upon. Thus, it will be seen that in a relatively short period of time, say a few seconds, and with a few simple movements, not necessarily involving the use of tools, the block B may be firmly clamped in position. Conversely, removal of the block may be effectuated with even greater simplicity of movement, due to the fact that upon counterclockwise rotation of the thumbnut 29, and subsequent disengagement of the bolt head from the recess 19, the bolt will drop into place with the head 31 thereof retracted within the counterbore 38.

Figure 4 of the drawings illustrates the use of the clamp previously described anchored to a machine bed 80, for example, having an open-ended T-slot in the top face thereof. For this purpose a bolt 52, received upwardly through the slot 25 in web 24 is screwed in a threaded hole 51 in the bracket in alignment with the slot, to have a head 53 on the bolt fixed below the bottom of the bracket for sliding reception in said T-slot. The arrangement is such that when the head 53 is received in the T-slot 50 from an open end thereof, the base of the bracket 20 will be in snug but sliding engagement with the top of the machine bed 80 to permit movement of the clamp to a convenient location for releasably clamping work W thereon as previously described.

In Figure 5 there is shown a modified form of anchor bolt 60 in connection with the clamp in the form thereof best shown in Figures 1 and 2 for facilitating lifting the bolt 60 to anchor the clamp thereto. The head portion 61 is provided with an annular recess 62 in the flat top face thereof, defining an undercut protuberance 63 which is flush with said flat face.

In Figure 6 is shown a modified form of clamp, which is similar in all respects to the clamp of Figures 1, 2 and 3, except with reference to the anchoring means. In this form of the invention, the bracket 20 is provided with an integral, downwardly offset lug 70 substantially parallel to the plane of the base, and having an outwardly opening slot 71 therein for reception of a lag screw 72 threaded into the work table at the bottom of a recess 73 therein. The head 74 of the lag screw is spaced from the bottom of said recess 73 but the top of the head 74 is flush with the top of the work table, and the recess 73 is sufficiently enlarged with respect to the size of the said lag screw head to permit ready reception of the slotted lug into cooperation with the lag screw under the head 74. This arrangement is such that when clamping action is applied to the screw shaft 26, against the work M, the base of the clamp will be urged flatly against the working surface about a fulcrum point which is the point of engagement of lug 70 with the underside of the lag screw head.

Other modifications of the invention may be resorted to without deviating from the spirit thereof or the scope of the appended claims.

What is claimed is:

1. A surface clamp for use on a flat working surface, comprising a bracket having a flat bottomed base of broad lateral area extending in one direction, an upright extension therefrom provided with an offset portion at an inner side of the bracket adapted to overhang the working surface in the opposite direction and unobstructedly with respect to any other part of the bracket above said working surface, a pressure applying screw threaded through said offset portion to extend axially toward the plane of said base, releasable anchor means for anchoring said bracket on the working surface to have work thereon positioned under said screw, means on said screw for turning the same against the positioned work, and a slab-like work supporting member providing said working surface and having an aperture therethrough counterbored inwardly of the working surface, said anchor means including an element vertically slidably received through said aperture, said element having stop means on the lower end thereof engageable with the underside of said slab for limiting upwardly vertical movement of the element and a head at the upper end of the element adapted to be predeterminately spaced above said working surface in the upwardly limited position of the element, said anchor means also including a web portion on said base portion thereof at the inner edge thereof and substantially in a horizontal plane, said web portion having a recess opening toward an edge thereof for reception of said element with the web portion engaged between said working surface and said head in the raised position of said element.

2. A surface clamp for use on a flat working surface, comprising a bracket having a flat bottomed base of broad lateral area extending in one direction, an upright extension therefrom provided with an offset portion at an inner side of the bracket adapted to overhang the working surface unobstructedly in the opposite direction and with respect to any other part of the bracket above said working surface, a pressure applying screw threaded through said offset portion to extend axially toward the plane of said base, anchor means for removably anchoring said bracket on the working surface to have work thereon positioned under said screw, means on said screw for turning the same against the positioned work, and a slab-like work supporting member providing said working surface and having an aperture extending downwardly from said working surface and terminating in a downwardly presented face portion of the work-supporting member, said bracket having a vertical wall portion at said inner side thereof forming an angle with the bottom of said base, a cavity of substantial depth being provided in said vertical wall portion at a point above the bottom of said base to define a web portion on the base substantially on a horizontal plane, said web portion having a recess vertically therethrough opening to the edge of the web at said inner side of the bracket, said anchor means including an elongated element received vertically through said aperture in said work-supporting member and through said recess in said web portion, said elongated element having a head at the lower end thereof for upward stop engagement of the same with said downwardly presented face portion of work-supporting member, means on the upper end of said elongated element releasably engaging the bracket within the outer boundaries of the bracket and outwardly unobstructedly with reference to the same, the last-named means thereby preventing downward movement of said elongated element relatively of said bracket.

3. A surface clamp for use on a flat working surface, comprising a bracket having a flat bottomed base of broad lateral area extending in one direction, an upright extension therefrom provided with an offset portion at an inner side of the bracket adapted to overhang the working surface unobstructedly in the opposite direction and with respect to any other part of the bracket above said working surface, a pressure applying screw threaded through said offset portion to extend axially toward the plane of said base, anchor means for removably anchoring said bracket on the working surface to have work thereon positioned under said screw, means on said screw for turning the same against the position work, and a slab-like work supporting member providing said working surface and having an elongated T-slot extending downwardly from said working surface and terminating in a downwardly presented slotted face portion, said bracket having a vertical wall portion at said inner side thereof forming an angle with the bottom of said base, a cavity of substantial depth being provided in said vertical wall portion at a point above the bottom of said base to define a web portion on the base substantially in a horizontal plane, said web portion having a recess vertically therethrough opening to the edge of the web at said inner side of the bracket, said anchor means including an elongated element received vertically through said elongated T-slot of the work-supporting member and through said recess in said web portion, said elongated element having a head at the lower end thereof for upward stop engagement of the same with said downwardly presented slotted surface portion of the work-supporting member, the upper end of said elongated element being removably threaded in said bracket above said cavity.

HENRY E. CASTON.

References Cited in the file of this patent

UNITED STATES PATENTS

| Number | Name | Date |
|---|---|---|
| 282,961 | Crispin | Aug. 14, 1883 |
| 822,775 | Schnurr | June 5, 1906 |
| 974,482 | Goodell | Nov. 1, 1910 |
| 1,156,781 | Jackson | Oct. 12, 1915 |
| 1,583,566 | Wismer | June 15, 1926 |
| 1,973,238 | Walter | Sept. 11, 1934 |
| 2,285,148 | Czajka | June 2, 1942 |
| 2,390,022 | Wood | Nov. 27, 1945 |
| 2,466,518 | Wagner | Apr. 5, 1949 |